United States Patent [19]

Hanson

[11] Patent Number: 4,573,284
[45] Date of Patent: Mar. 4, 1986

[54] LEADER WINDING DEVICE

[76] Inventor: Richard A. Hanson, 21220 NE. 156th Ave., Woodinville, Wash. 98072

[21] Appl. No.: 603,448

[22] Filed: Apr. 24, 1984

[51] Int. Cl.[4] .............................................. A01K 97/06
[52] U.S. Cl. ................................................. 43/57.2
[58] Field of Search ................................ 43/57.1, 57.2

[56] References Cited

U.S. PATENT DOCUMENTS

| | | | |
|---|---|---|---|
| 2,595,463 | 5/1952 | Kamps | 43/57.2 |
| 2,596,896 | 5/1952 | Goad | 43/57.2 |
| 2,601,736 | 7/1952 | Fisher | 43/43.11 |
| 2,730,833 | 1/1956 | Newell | 43/57.2 |
| 2,789,389 | 4/1957 | Moen | 43/57.2 |
| 2,791,863 | 5/1957 | Sweeney | 43/57.2 |
| 2,826,856 | 3/1958 | Marion et al. | 43/57.2 |
| 3,122,855 | 3/1964 | Collier | 43/57.2 |
| 3,397,480 | 8/1968 | Bengtsson | 43/54.1 |
| 3,564,755 | 2/1971 | Lindgren, Sr. | 43/57.2 |
| 3,785,080 | 1/1974 | Wallace | 43/54.1 |
| 3,890,737 | 6/1975 | Jones | 43/57.2 |
| 3,991,507 | 11/1976 | Bart | 43/53.2 |
| 4,006,554 | 2/1977 | Tice | 43/57.2 |
| 4,036,451 | 7/1977 | Pipkin | 242/137.1 |

*Primary Examiner*—Nicholas P. Godici
*Assistant Examiner*—C. McKee
*Attorney, Agent, or Firm*—Gregory W. Moravan

[57] ABSTRACT

A device for winding leaders, wherein the device will securely and protectively wind leaders of any length, regardless of whether the ends of the leaders terminate in hooks, swivels or loops. Separate leader winding recesses are provided which encircle the device. For leaders having leader lines with some elasticity, the leader is wound on the device under tension. Alternatively, for leaders having any type of leader line, whether elastic or non-elastic, the wound leaders are passed under tension over an elastic member extending about the periphery of the device, thereby deflecting the elastic member. The tension of the wound elastic leader line or the deflected elastic member maintains tension separately on each wound leader to keep it from tangling and to keep its ends securely anchored. Various anchor points for the hook, loop or swivel on the end of each leader, and different winding paths for each leader are provided to assist in winding leaders of any given length and any given type. Air trapping chambers are provided for flotation to help keep the device from sinking if dropped in the water.

35 Claims, 3 Drawing Figures

LEADER WINDING DEVICE

BACKGROUND OF THE INVENTION

The invention relates to devices for winding line type objects; and more particularly relates to a device for winding fishing leaders or fishing leader setups, wherein the device automatically keeps the wound fishing leaders or fishing leader setups (hereafter referred to simply as leaders) under tension.

SUMMARY OF THE INVENTION

There is a continuing need for a device to store one or more leaders in a secure and protected manner; wherein the device will allow to be wound on it leaders of any length; and wherein the device will allow the user to easily wind and remove any particular leader from the device without disturbing the others by providing separate winding recesses for each leader. The invention fills all of these needs.

A further object of the invention is to allow winding on the device leaders which contain elements in addition to hooks such as swivels, beads, spinners, weights, loops and the like.

An additional object is to provide means for securing both ends of the wound leader regardless of whether the ends of the leader terminate in a hook, loop or swivel.

Another object of the invention is to automatically maintain a tension on the wound leader, in order to prevent tangling of the wound leader and to help ensure the hook, swivel or loop on each end of the wound leader will not become accidentally disloged from the device.

A further object is to provide a location for spinners and the like, which may be on the wound leader, where they will not interfere in the winding and unwinding of the leaders.

Another object is to provide flotation to help to prevent sinking of the device should it be accidentally dropped in the water.

An additional object is to provide a strong, compact, low cost leader winding device.

The present invention fulfills all of these objectives by providing a device having one or more deep, protective leader winding recesses which completely encircle the device, and in which each leader is separately wound.

Various anchor points for the hook, loop or swivel at each end of each wound leader are provided so the device will accomodate leaders of any length. Different winding paths are provided among the various elements of the device so it will further accomodate leaders of any length.

The device may include an edge mounted elastic member which can be deflected to varying degrees by the wound leader to maintain a tension on the wound leader; to keep the hook, swivel or loop on the ends of the leader securely anchored in place; to prevent tangling of the wound leader; and to assist the device in accomodating leaders of any length.

Most of the anchor points for the hook, loop or swivel at each end of the leader are elevated above the bottom of the leader winding recesses so the tension exerted on the wound leader will tend to pull said hook, loop or swivel downwardly at an angle to keep them firmly anchored. Anchor points for loops have adjacent supports which elevate the anchored loops above the bottom of the leader winding recesses so anchored loops can be more easily removed.

One type of anchor point will serve to anchor hooks, loops and swivels. Mounting locations for spinners are also provided. Flotation is provided by fabricating the device from a plastic which is lighter than water, and/or by providing air trapping chambers each having one open end, which chambers tend to automatically trap air if the device is dropped in the water.

Injection molding the device in one piece from strong plastic makes it durable and low cost.

The foregoing is a brief summary of, not a detailed catalog of, the various objects, features, advantages and characteristics of the invention, since these and further objects, features, advantages and characteristics will be expressly or inherently disclosed to those in the art to which it pertains in view of all of the disclosures herein.

DESCRIPTION OF THE PREFERRED EMBODIMENTS

Figure 1:
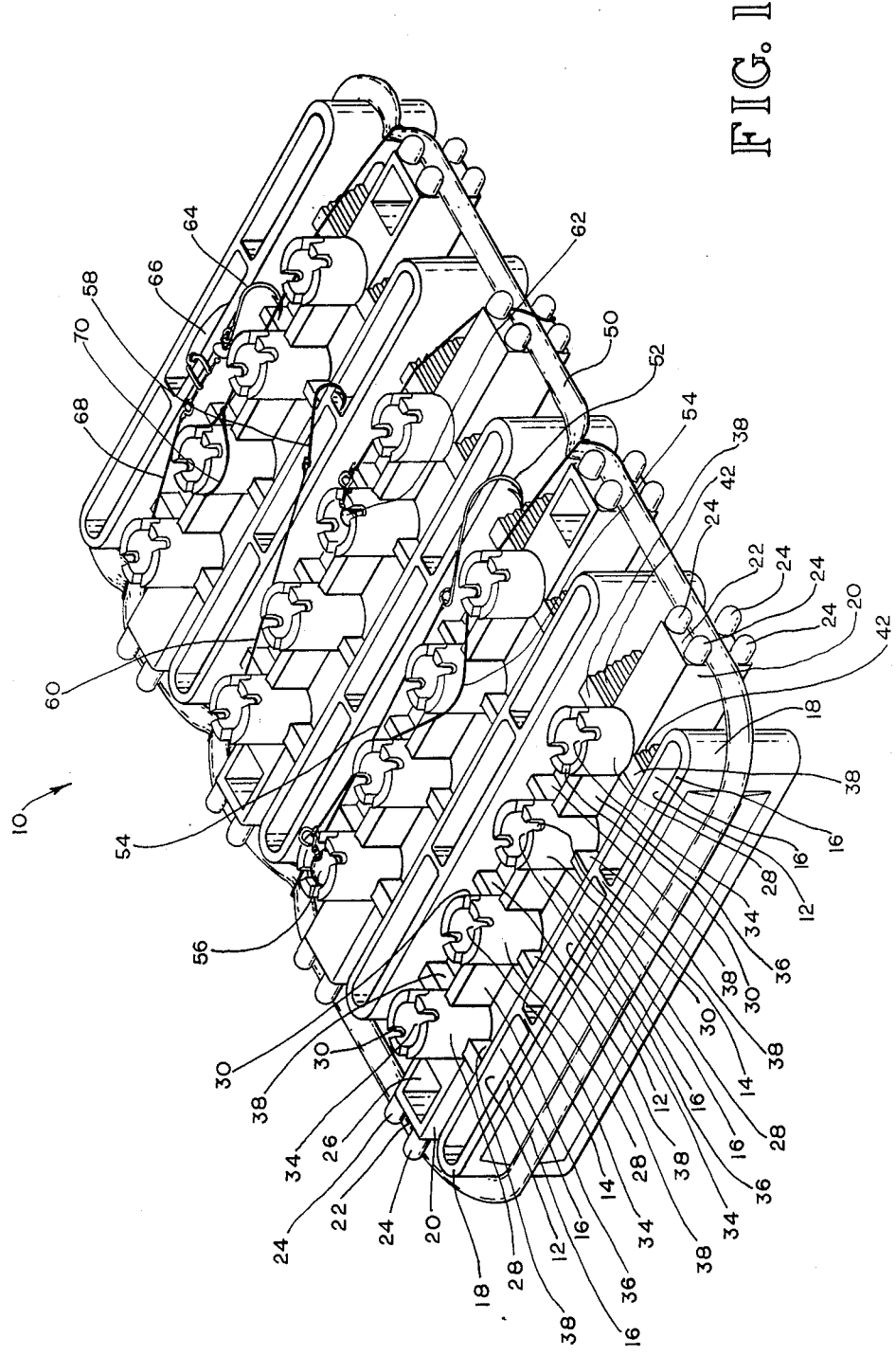
FIG. 1 is a perspective view of the leader winder device.

Referring now to the figures, the leader winder device 10 is preferably formed in one piece from any suitable strong, rigid plastic such as low density polyethylene, by the use of conventional injection molding techniques.

The device 10 shown in the figures is strictly by way of non-limiting example. Regarding any particular feature discussed below, it is to be understood that fewer or more of any particular feature could be provided, without departing from the intended scope of the invention. In addition, the particular leaders described below in the use of device 10 are merely by way of non-limiting example.

First, a description of the various features of device 10 will be given. Then the use of these features will be considered. For clarity, in the drawings only a few of each particular feature will be numbered with a reference numeral, it being understood that the rest of each particular feature illustrated in the drawings bears the same reference numeral by intended implication. When the quantity of each feature is stated, the quantity seen on only one side of the device 10 is given, it being understood there is an equal quantity seen on the device 10's other side.

A plurality of face slots 12 are provided, fifteen of them being illustrated, with adjacent face slots 12 being separated from each other by slot cross bars 14; ten slot cross bars 14 being illustrated. Slots 12 have side walls 16 and end walls 18. Slots 12 preferably extend completely through the device 10, but need not necessarily do so.

Figure 2:
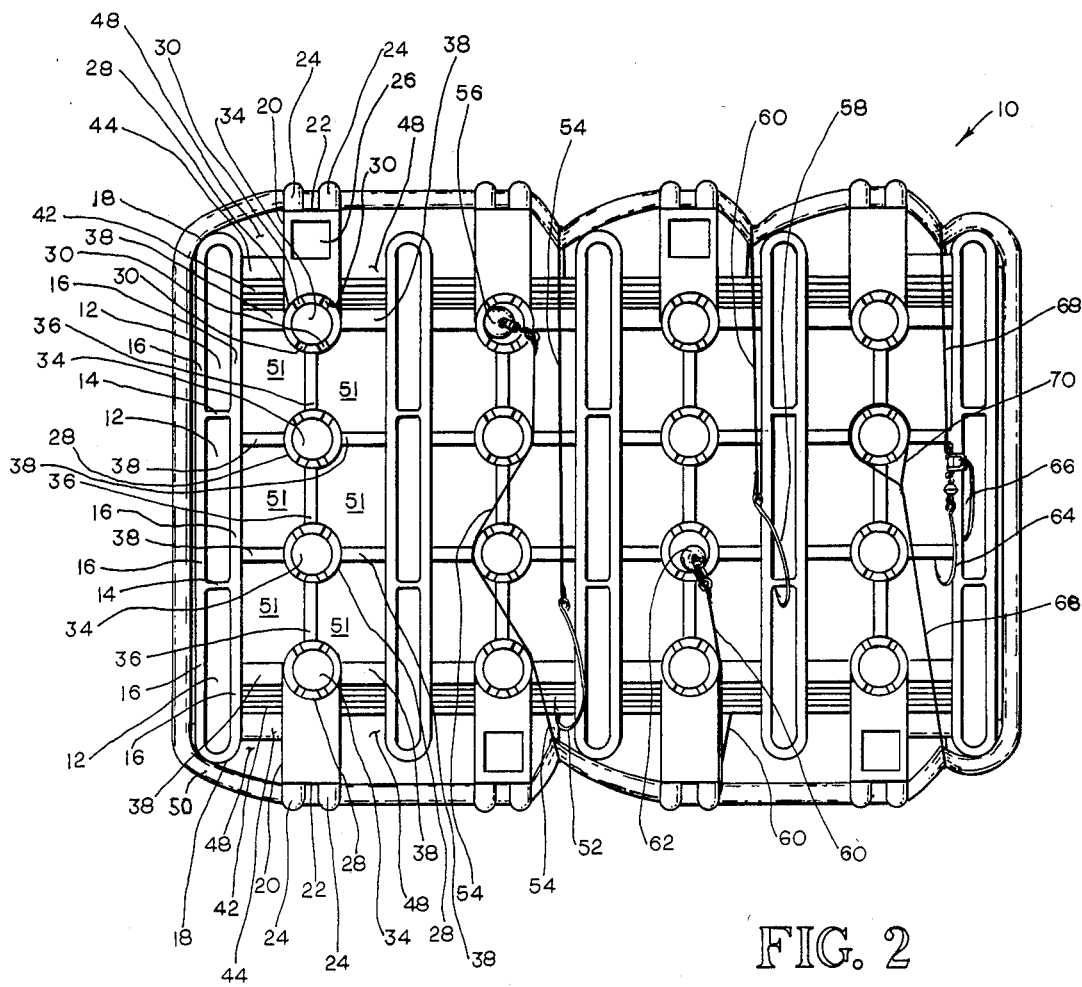
FIG. 2 is a face elevation view of FIG. 1, the opposite face of the leader winder device being the same, except as described in the specification.

Eight edge pillars 20 are illustrated, each edge piller having an edge face 22, four edge posts 24, and a deep chamber 26. Each chamber 26 preferably does not extend completely through its edge pillar 20. In inspecting FIG. 2, chambers 26 are not seen for our of edge pillars 20 because their edge chambers open on the opposite face of the device 10. Thus, if device 10 were turned over, the chambers 26 not seen for said four edge pillars 20 in FIG. 2, would then be seen; and regarding those edge pillars 20 in which their chambers 26 are seen in FIG. 2, their chambers 26 would not be seen if device 10 were turned over.

Sixteen face posts 28 are illustrated, each face post having four notches 30 and a hole 34 which preferably extends completely through device 10, but need not do so.

Extending between adjacent face posts 28 are face post ribs 36, twelve face post ribs 36 being illustrated. Extending between face posts 28 and their adjacent side walls 16 of face slots 12 are face cross ribs 38, thirty-two face cross ribs 38 being illustrated.

Figure 3:
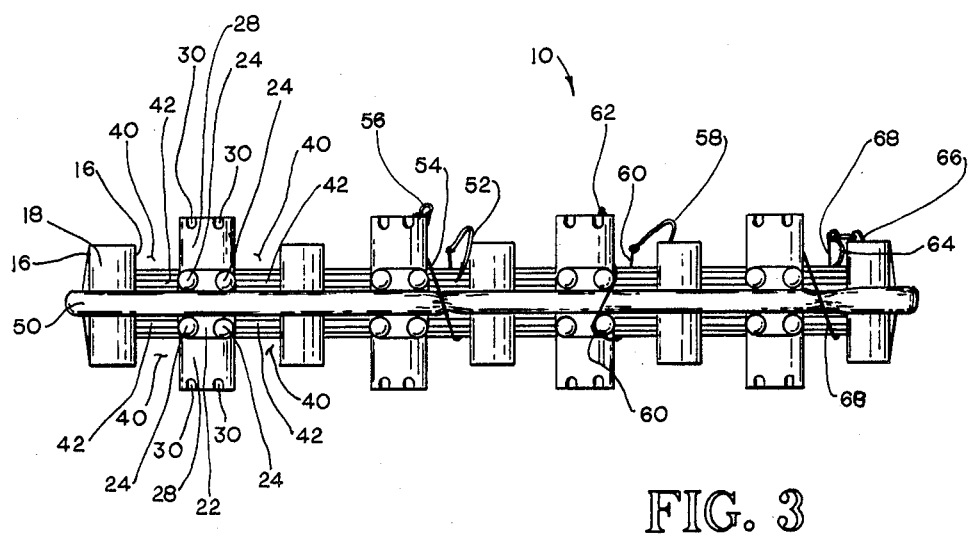
FIG. 3 is an edge elevation view of FIG. 1, the opposite edge of the leader winder device being the same.

Eight leader winding face recesses 40 are illustrated (see FIG. 3); each leader winding face recess 40 having a bottom defined by the tops of the face cross ribs 38, and having opposite sides defined by one side of four face posts 28 and their opposing side walls 16 of face slots 12.

Extending between one side of each edge pillar 20 and its opposing side wall 16 of face slot 12, are a set of edge steps 42; six edge steps 42 in each set and sixteen sets of edge steps 42 being illustrated.

Extending between four edge pillars 20 and their opposing side walls 16 of face slots 12 are four optional reinforcing ribs 44 which help to prevent any bowing of end walls 18 and side walls 16 of face slots 12.

Sixteen leader winding edge recesses 48 are illustrated. For twelve of the leader winding edge recesses 48, each of them has a bottom defined by the top of an outermost edge stp 42, and has opposite sides defined by one side of an edge pillar 20 and its opposing side wall 16 and end wall 18 of face slot 12. For four of the leader winding edge recesses 48, each of them has a bottom defined by the top of reinforcing rib 44, and has opposite sides defined by one side of an edge pillar 20 and its opposing side wall 16 and end wall 18 of face slot 12.

An elastic member 50 is provided as illustrated. Alternatively, although not illustrated, elastic member 50 may be omitted if it is intended that monofilament leaders be wound on the device 10, since monofilament leaders themselves have enough elasticity to perform the functions provided by elastic member 50 which are described below.

Formed between face cross ribs 38, face post ribs 36 and side walls 16 of face slots 12 are a plurality of face chambers 51; twenty face chambers 51 being illustrated.

Now that the basic features of device 10 have been described, the use of device 10 and certain additional features will be addressed. It is to be understood that the particular leaders which are described below, and the fashion in which they are used on device 10, are by way of non-limiting example.

Referring now to FIG. 1, a basic leader is illustrated comprising a length of fishing line 54 having a hook 52 at one end and a swivel 56 at the other end. Swivel 56 can be either a regular swivel or a snap swivel. For clarity, other elements frequently found on leaders such as weights, spoons, spinners and lures are not illustrated since the use of device 10 can be adequately addressed without them. When any leader to be wound has a hook 52 at one end, it is advisable, for safety's sake, to first anchor the point of hook 52 in device 10 before winding the rest of the leader on device 10. The point of hook 52 can be anchored on any edge step 42, face post hole 34, face slot 12, face cross rib edge 38, edge pillar chamber 26, or edge face 22.

Since any given leader has only a certain length, it will be appreciated that by suitably selecting a particular one of the preceeding locations to anchor the point of the leader's hook 52, the proper anchoring of the leader's swivel 56 to device 10 could be facilitated. Such selection would only be required if, for example, the leader had more than one hook 52.

In FIG. 1, the point of hook 52 is first anchored, as shown, in an edge step 42 and then the leader's fishing line 54 is passed through leader winding face recess 40. It is next passed over the left hand portion of elastic member 50 with enough tension to substantially deflect elastic member 50 into leader winding edge recess 48 as shown. The resiliency of elastic member 50 will keep a tension on the leader's fishing line 54 which acts to keep the point of hook 52 firmly anchored in edge step 42. The taut fishing line 54 is then passed through the corresponding leader winding face recess 40 on the opposite face of device 10 and over the right hand portion of elastic member 50 with enough tension to substantially deflect elastic member 50 into corresponding leader winding edge recess 48. Still keeping lines 54 taut, swivel 56 is then inserted into hole 34 of one of the face posts 28 to anchor it, as shown. The resiliency of elastic member 50 keeps fishing line 54 taut, to help prevent tangling of fishing line 54, and also creates a tension on the end of swivel 56 which tips swivel 56 in hole 34, thereby jamming swivel 56 in place in hole 34 of face post 28.

It is noted that leader winding edge recesses 48 are deep enough to permit a variable amount of deflection of elastic member 50 by line 54 therein. This facilitates the finding of an appropriate hole 34 of one of the face posts 28 in which to anchor swivel 56, since the final location of swivel 56 with respect to the surface of device 10 will depend to a certain degree on how much elastic member 50 is deflected into edge recesses 48. Elastic member 50 is selected such that even small deflections thereof by line 54 will provide adequate tension on line 54 to keep the point of hook 52 anchored in edge step 42, to prevent tangling of line 54, and to keep swivel 56 jammed in hole 34 of face post 28.

The existence of multiple face posts 28 makes possible the proper anchoring of swivel 56 since one of them will be suitable for a leader of any given length; since the spacing between adjacent face posts 28 is less than the elastic stretch of the leader, and is less than the maximum deflection of elastic member 50 into leader winding edge recess 48.

The tops of face posts 28 are elevated above the bottom of the leader winding face recesses 40 in which line 54 lies for several reasons. First, line 54 can be passed alternately in and out around face posts 28, as seen in FIG. 1, to additionally facilitate the finding of an appropriate hole 34 in one of the face posts 28 in which to anchor swivel 56. Second, such elevation of the tops of face posts 28 facilitates the desired jamming of swivel 56 in hole 34 of one of the face posts 28 since line 54 will tend to pull swivel 56 down at an angle which helps prevent swivel 56 from accidentally falling out of its hole 34. The diameter and depths of holes 34 in face posts 28 are selected so holes 34 will suitably receive even the largest swivel 56 device 10 is intended to receive. The jamming effect of swivel 56 in holes 34 is sufficient to hold swivel 56 securely in place even if swivel 56 is somewhat smaller than holes 34. Thus, holes 34 need not be all of the same size, or different devices 10 could be provided having larger or smaller holes 34 depending on the size of swivel 56 with which device 10 is designed to be used.

Referring again to FIG. 1, a second leader is illustrated having the point of its hook 58 anchored in cross bar 14 of one of the face slots 12. The leader's fishing line 60 is passed into adjacent leader winding face recess 40, and is then passed under tension over elastic member 50, thereby deflecting elastic member 50 into leader winding edge recess 48. The resilient elastic member 50 exerts a tension via line 60 on hook 58 to keep the point of hook 58 firmly anchored in cross bar 14 of face slot 12.

It is noted the top of all face slots 12 are above the bottom of leader winding face recess 40. This ensures that the tension on hook 58 exerted by elastic member 50 via line 60 will tend to pull hook 58 at an angle downwardly, thereby assisting in keeping the point of hook 58 firmly anchored in cross bar 14 of face slot 12.

Line 60 is then passed through the opposing leader winding face recess 40 on the opposite face of device 10. Next line 60 is passed over elastic member 50 on top of edge pillar 20 and is also passed alternately around adjacent edge posts 24 on top edge 22 of pillar 20 as seen in FIG. 1. It is preferred that the tops of edge posts 24 be rounded, as illustrated, to assist in guiding the line 60 between edge posts 24.

It is to be noted that if line 60 is passed alternately around adjacent edge posts 24, as illustrated, the selection of an appropriate hole 34 in one of the face posts 28 in which to seat swivel 62 may be facilitated. In addition, note that since top face 22 of edge pillar 20 which supports edge posts 24 is higher than the bottom of leader winding edge recess 48, a longer path is traversed by line 60 when it passes over outer face 22 of edge pillar 20, such as is illustrated, than if line 60 passed instead over elastic member 50 and deflected elastic member 50 into adjacent leader winding edge recess 48. This also may serve to facilitate the selection of an appropriate hole 34 in one of the face posts 28 in which to anchor swivel 62.

The length of edge posts 24 is selected to be greater than the combined thickness of elastic member 50 and line 60, to protect elastic member 50 and line 60, and to retain elastic member 50 on top of edge pillars 20.

It is preferred that when line 60 is passed alternately around edge posts 24, it be passed alternately around edge posts 24 as illustrated in FIG. 1 in order to better align line 60 with leader winding face recess 40 in order to keep line 60 from laying over the tops of face posts 28 which would tend to eliminate the downward jamming force exerted by line 60 on swivel 62. For the same reason, it is preferred that line 60 be passed alternately around the edge posts 24 adjacent the edge of leader winding edge recess 48 and leader winding face recess 40 in which line 60 is being wound. Of course it is within the scope of the invention that line 60 could be passed alternately around, or even between, edge posts 24 on any edge pillar 20 in any fashion, either once, or repeatedly.

It is also preferred that the tops of face posts 28 and the tops of sidewalls 16 and end walls 18 of side slots 12 which define the top surface of leader winding face recess 40 be higher than edge posts 24, so that if line 60 is passed between or alternately around edge posts 24, line 60 will be better protected by the top surfaces of face posts 28 and the top surfaces of side walls 16 and end walls 18 of side slots 12.

It is understood that there could be as few as one edge post 24 on each edge pillar 20, or more than four posts 24 on each edge pillar 20; and that all of the edge pillars 20 need not have the same number or arrangement of edge posts 24.

After line 60 has been passed over the top of edge pillar 20, as illustrated in FIG. 1, swivel 62 is anchored in face hole 34 of face post 28. Note that, as seen in FIG. 1, the neck of the swivel loop on swivel 62 is engaged in notch 30 on face post 28. This is because, by way of non-limiting example, swivel 62 is so small as compared to face hole 34 in face post 28 that it does not jam well in hole 34. Thus, the tension on line 60 exerted by elastic member 50 might tend to pull swivel 62 out of face hole 34. However, since the neck of the swivel loop on swivel 62 is engaged by notch 30 of face post 28, swivel 62 is retained in face hole 34.

Preferably, all of the notches 30 on face posts 28 are aimed toward their respective adjacent leader winding face recesses 40 adjacent face posts 28, or adjacent leader winding edge recesses 48, to align them better with the pull exerted by line 60 on any swivel 62 anchored therein. Preferably, notches 30 are above the bottom of leader winding face recesses 40, so the pull exerted by line 60 on a swivel 62 mounted therein will be angled downwardly somewhat, thereby even more firmly engaging the neck of the loop of swivel 62 in its notch 30 in face post 28.

As before, the tension exerted by elastic member 50 on line 60 tends to keep the point of hook 58 firmly anchored in cross bar 14 of face slot 12, tends to keep line 60 from tangling, and tends to keep even a small swivel 62 seated in notch 30 of face post 28.

Referring again to FIG. 1, a third leader comprising hook 64, spinner 66, fishing line 68 and loop 70 is illustrated. The point of hook 64 is anchored in face cross rib 38 and spinner 66 is received in adjacent face slot 12. Line 68 is passed through winding face recess 40 and over elastic member 50 under tension, thereby deflecting elastic member 50 into leader winding edge recess 40 illustrated. While still maintaining a tension on line 68, it is passed through opposing leader winding face recess 40 on the opposite side of device 10 and then over elastic member 50, thereby defelcting elastic member 50 once again into another leader winding edge recess 40, as shown. Finally, while still maintaining a tension on line 68, loop 70 of line 68 is passed over a suitable face post 28 to anchor it, as shown.

The tension maintained on line 68 by deflected elastic member 50 keeps the point of hook 64 anchored in face cross rib 38, keeps line 68 from tangling and keeps loop 70 anchored around face post 28.

It is noted face post ribs 36, two of which support loop 70 as shown, are higer than the bottom of leader winding face recess 40. This is done for two reasons. First, the tension exerted on loop 70 by line 68 will tug loop 70 downward at an angle, thereby tending to keep loop 70 on face post 28. Second, since loop 70 is preferably anchored on device 10 last, and is higher than the line 68 wound in leader winding face recess 40, as mentioned above, loop 70 is easily removed from face post 28 when desired.

Loop 70 could also be passed over one of the edge pillars 20 where it would be supported by elastic member 50 on top of one of edge pillars 20 and/or by edge posts 24 on top of one of edge pillars 20. Since edge posts 24 and elastic member 50 on top of pillar 20 are well above the bottoms of leader winding edge recess 48 and leader winding face recess 40 in which line 68 is wound, the tension exerted by line 68 on loop 70 tends to keep loop 70 anchored securely in place, and also makes loop 70 easily removed when desired.

From the foregoing it is seen that lines 54, 60, 68, for example, wound on device 10, are mostly wound below the top surfaces of face posts 28, edge posts 24, end walls 18 of face slots 12, and side walls 16 of face slots 12, thereby protecting lines 54, 60, 68 from the outside environment.

Preferably, the space between adjacent face posts 28 and the spaces between face cross ribs 36 and the adjacent side walls 16 of face slots 12, are such that the fingertips of the user will be able to conveniently grasp loop 70 when it is desired to remove loop 70 from face past 28. By way of non-limiting example, the distance between adjacent face posts 28 could be about ¼ of an inch, and the space between face cross rib 36 and the adjacent side wall 16 of face slot 12 could be about 5/16ths of an inch.

It is noted that a certain amount of flotation is provided by face chambers 51 and edge pillar chambers 26 which will tend to trap air if the device 10 is dropped in the water, thereby helping to keep device 10 from sinking.

Despite the fact numerous leader sets could be wound at the same time on device 10, device 10 can still be made small enough, by way of non-limiting example, to fit in a pocket, and be about 4 ¼ inches long, 3 3/16 inches wide at its widest part, and about ⅜ inches thick at its thickest part.

It is to be noted that device 10 could be used to wind any other line type of object and so the present invention is not limited to winding fishing leaders or fishing leader sets.

From the foregoing, and in view of the disclosures herein, various further modifications, adaptations, and uses of the device 10 will be apparent to those in the art to which it pertains, within the scope of the claims appended hereto.

What is claim is:

1. A leader winding device adapted to have securely wound about it at least one wound leader of any given length comprising a length of wound leader line having attachment means at each end thereof, wherein each said attachment means comprises one of a hook, swivel and loop, wherein said device comprises:
   a body having at least one face surface, and at least one edge surface, wherein said body defines at least one leader winding recess between at least two at least generally planar wall surfaces comprising at least one leader winding face recess within said face surface and at least one leader winding edge recess within said edge surface; wherein said leader winding recess is adapted to receive within it and protect at least a portion of said wound leader;
   a plurality of spaced apart body anchor means adapted to anchor said attachment means; wherein said body anchor means are located exterior to and adjacent said leader winding recess; wherein the selection of a particular body anchor means for each of said attachment means helps to enable said wound leader of any given length to be wound on said device;
   wherein said at least one wound leader is adapted to be wound alternately among at least one adjacent pair of said body anchor means; and
   wherein the length of a particular route followed by said wound leader on said device varies substantially depending on said particular route followed by said wound leader with respect to said body anchor means to help to enable said wound leader of any given length to be wound on said device.

2. A leader winding device according to claim 1, wherein said wound leader has some elasticity; wherein said wound leader is wound on said device under tension; wherein at least one of said body anchor means is elevated and is adapted to anchor said attachment means at an elevated location elevated substantially above the bottom of said leader winding recess; and wherein said attachment means are anchored to a respective elevated body anchor means at least partially by a substantial downward anchoring force provided by said wound leader due to said elevated location and due to said tension of said wound leader which is wound below said elevated location in said leader winding recess.

3. A leader winding device according to claim 2, wherein said at least one elevated body anchor means comprises a triple function elevated face post having a side wall defining an elevated fast post hole; wherein a portion of said side wall extends generally transversely with respect to said wound leader; wherein said elevated face post hole is adapted to anchor said hook by said elevated face post hole being sized to receive at least the point of said hook therein within said side wall, wherein said hook is helped to be anchored in said elevated face post hole due to said tension of said wound leader; wherein said elevated face post hole is adapted to anchor said swivel by said elevated face post hole being sized to receive at least a portion of said swivel therein, wherein said swivel is helped to be anchored in said elevated face post hole by said swivel being urged to tilt in said elevated face post hole, due to said tension of said wound leader, to tend to jam said swivel in said elevated face post hole; and wherein said elevated face post is adapted to anchor said loop by said elevated face post being sized to enable said loop to encircle said elevated face post, wherein said loop is helped to be anchored to said elevated face post due to said tension of said wound leader.

4. A leader winding device according to claim 2, wherein at least one of said elevated body anchor means is an elevated face opening defined by an elevated face opening side wall of said body; wherein one of said attachment means is a hook; and wherein said elevated face opening is adapted to anchor said hook at an anchor location elevated above the bottom of said leader winding recess by said elevated face opening being sized to receive at least the point of said hook therein within said elevated face opening side wall; wherein a portion of said elevated face opening side wall extends generally transversely with respect to said wound leader; wherein said anchor location is on said transverse portion of said elevated face opening side wall; and wherein said elevated anchor location for said hook helps to ensure said hook anchored in said elevated face opening is urged at least partially downwardly at an angle by said wound leader due to said tension of said wound leader to help ensure said hook stays anchored in said elevated face opening.

5. A leader winding device according to claim 1, wherein at least one of said anchor means is an edge step defined in the bottom of at least one said leader winding edge recess; wherein a parallel portion of said edge step extends generally parallel to said wound leader; wherein one of said attachment means is a hook; and wherein said parallel portion of said edge step is adapted to anchor said hook by engaging the point of said hook.

6. A leader winding device according to claim 1, wherein at least one of said body anchor means is a face opening defined by a face opening side wall of said body; wherein one of said attachment means is a hook; and wherein said face opening is adapted to anchor said hook at an anchor location on said face opening side wall by said face opening being sized to receive at least the point of said hook therein within said face opening side wall, wherein a portion of said face opening side wall extends generally transversely with respect to said wound leader and wherein said anchor location is on said transverse portion of said face opening side wall.

7. A leader winding device according to claim 6, wherein said face opening is elevated above the bottom of said leader winding recess; and wherein said anchor location on said face opening side wall for said hook is elevated above the bottom of said leader winding recess to help to ensure said hook anchored in said face opening is urged at least partially downwardly at an angle by said wound leader due to said tension of said wound leader to help ensure said hook stays anchored in said face opening.

8. A leader winding device according to claim 6, wherein said leader further comprises a spinner secured to at least one of said hook and said leader line; and wherein said elevated face opening is relatively long and narrow and is sized to be adapted to receive at least a substantial portion of said spinner therein.

9. A leader winding device adapted to have securely wound about it at least one leader of any given length comprising a length of leader line having attachment means at each end thereof, wherein each said attachment means comprises one of a hook, swivel and loop, wherein said device comprises:
a body having at least one face, and at least one edge, wherein said body defines at least one leader winding recess comprising at least one leader winding face recess and at least one leader winding edge recess; wherein said leader winding recess is adapted to receive within it and protect at least a portion of said wound leader;
a plurality of spaced apart body anchor means adapted to anchor said attachment means; wherein said body anchor means are adjacent said leader winding recess; wherein the selection of a particular anchor means for each of said attachment means helps to enable leaders of different lengths to be wound on said device;
wherein the particular route followed by said wound leader on said device helps to enable said leader of any given length to be wound on said device;
wherein said leader line has some elasticity; wherein said elastic leader line is wound on said device under tension; wherein at least a portion of said body anchor means are elevated above the bottom of said leader winding recess; wherein said elevation helps to ensure said attachment means anchored by said elevated body anchor means is urged at least partially downwardly at an angle by said leader line due to said tension of said leader line to help ensure said attachment means stays anchored to its respective said body anchor means;
wherein at least a portion of said elevated body anchor means each comprise a face post defining a face post hole; wherein when one of said attachment means is said hook said face post is adapted to anchor said hook by its face post hole being sized to receive at least the point of said hook therein, wherein said hook is helped to be anchored in said face post due to said tension of said leader line; wherein when one of said attachment means is said swivel said face post hole is adapted to anchor said swivel by being sized to receive at least a portion of said swivel therein, wherein said swivel is helped to be anchored in said face post hole by said swivel being urged to tilt in said face post hole, due to said tension of said leader line, to tend to jam said swivel in said face post hole; and wherein when one of said attachment means is said loop, said face post is adapted to anchor said loop by being sized to enable said loop to encircle said face post, wherein said loop is helped to be anchored to said face post due to said tension of said leader line; and
wherein at least one of said face post means defines at the top thereof at least one notch; and wherein said notch is adapted to engage a portion of said swivel, to help to anchor said swivel, wherein said tension of said leader line tends to help keep said swivel engaged in said notch.

10. A leader winding device adapted to have securely wound about it at least one leader of any given length comprising a length of leader line having attachment means at each end thereof, wherein each said attachment means comprises one of a hook, swivel and loop, wherein said device comprises:
a body having at least one face, and at least one edge, wherein said body defines at least one leader winding recess comprising at least one leader winding face recess and at least one leader winding edge recess; wherein said leader winding recess is adapted to receive within it and protect at least a portion of said wound leader;
a plurality of spaced apart body anchor means adapted to anchor said attachment means; wherein said body anchor means are adjacent said leader winding recess; wherein the selection of a particular anchor means for each of said attachment means helps to enable leaders of different lengths to be wound on said device; and
wherein the particular route followed by said wound leader on said device helps to enable said leader of any given length to be wound on said device; and
wherein at least one of said body anchor means is a face post whose top is elevated above the bottom of its respective leader winding face recess; wherein said body further comprises face post rib means adjacent said at least one face post; wherein the top of said face post rib means is lower than the top of said at least one face post; and wherein the top of said face post rib means is elevated above the bottom of said leader winding face recess to support any said loop anchored by said face post to enable said loop to be more easily removed.

11. A leader winding device adapted to have securely wound about it at least one leader of any given length comprising a length of leader line having attachment means at each end thereof, wherein each said attachment means comprises one of a hook, swivel and loop, wherein said device comprises:
a body having at least one face, and at least one edge, wherein said body defines at least one leader winding recess comprising at least one leader winding face recess and at least one leader winding edge recess; wherein said leader winding recess is adapted to receive within it and protect at least a portion of said wound leader;

a plurality of spaced apart body anchor means adapted to anchor said attachment means; wherein said body anchor means are adjacent said leader winding recess; wherein the selection of a particular anchor means for each of said attachment means helps to enable leaders of different lengths to be wound on said device;

wherein the particular route followed by said wound leader on said device helps to enable said leader of any given length to be wound on said device; and wherein at least one of said body anchor means comprises an edge pillar adjacent at least one said leader winding edge recess, wherein the top edge surface of said edge pillar extends above the bottom of said leader winding edge recess; wherein said device further comprises at least one edge post located on said top edge surface of said edge pillar; wherein said at least one edge post is adaped to at least partially retain any portion of said leader line which is routed across said top edge surface of said edge post to help to enable said leader of any given length to be wound on said device.

12. A leader winding device according to claim 11, wherein said at least one edge pillar defines an edge pillar chamber which is adapted to entrap air if said device is dropped in the water to help to enable said device to float; and wherein said at least one edge pillar chamber comprises at least one body anchor means.

13. A leader winding device adapted to have securely wound about it at least one leader of any given length comprising a length of line having attachment means at each end thereof, wherein each said attachment means comprises one of a hook, swivel and loop, wherein said device comprises:

a body having at least one face, and at least one edge, wherein said body defines at least one leader winding recess comprising at least one leader winding face recess and at least one leader winding edge recess; wherein said leader winding recess is adapted to receive within it and protect at least a portion of said wound leader;

a plurality of spaced apart body anchor means adapted to anchor said attachment means; wherein said body anchor means are adjacent said leader winding recess; wherein the selection of a particular anchor means for each of said attachment means helps to enable leaders of different lengths to be wound on said device;

elastic member means extending transversely across at least one of said leader winding edge recesses; wherein said wound leader is adapted to pass over and deflect said elastic member means into at least one corresponding leader winding edge recess; wherein said deflection of said elastic member means maintains a tension on said wound leader means to help keep said attachment means firmly anchored, to help keep at least a substantial portion of said wound leader in said leader winding recess, and to help keep said wound leader from becoming tangled; wherein the amount of said deflection of said elastic member means helps to enable leaders of different lengths to be wound on said device; and wherein at least one of said body anchor means is a face post whose top is elevated above the bottom of its respective leader winding face recess; wherein said body further comprises face post rib means adjacent said at least one face post; wherein the top of said face post rib means is lower than the top of said at least one face post; and wherein the top of said face post rib means is elevated above the bottom of said leader winding face recess to support any loop anchored by said face post to enable said loop to be more easily removed.

14. A leader winding device adapted to have securely wound about it at least one leader of any given length comprising a length of line having attachment means at each end thereof, wherein each said attachment means comprises one of a hook, swivel and loop, wherein said device comprises:

a body having at least one face, and at least one edge, wherein said body defines at least one leader winding recess comprising at least one leader winding face recess and at least one leader winding edge recess; wherein said leader winding recess is adapted to receive within it and protect at least a portion of said wound leader;

a plurality of spaced apart body anchor means adapted to anchor said attachment means; wherein said body anchor means are adjacent said leader winding recess; wherein the selection of a particular anchor means for each of said attachment means helps to enable leaders of different lengths to be wound on said device;

elastic member means extending transversly across at least one of said leader winding edge recesses; wherein said wound leader is adapted to pass over and deflect said elastic member means into at least one corresponding leader winding edge recess; wherein said deflection of said elastic member means maintains a tension on said wound leader means to help keep said attachment means firmly anchored, to help keep at least a substantial portion of said wound leader in said leader winding recess, and to help keep said wound leader from becoming tangled; wherein the amount of said deflection of said elastic member means helps to enable leaders of different lengths to be wound on said device; and wherein at least one of said body anchor means comprises an edge pillar adjacent at least one said leader winding edge recess, wherein the top edge surface of said edge pillar extends above the bottom of said leader winding edge recess; wherein said device further comprises at least one edge post located on said top edge surface of said edge pillar; wherein said at least one edge post is adapted to at least partially retain any portion of said leader line which is routed across said top edge surface of said edge post to help to enable said leader of any given length to be wound on said device.

15. A leader winding device adapted to have securely wound about it at least one wound leader of any given length comprising a length of wound leader line having attachment means at each end thereof, wherein each said attachment means comprises one of a hook, swivel and loop, wherein said device comprises:

a body having at least one face surface, and at least one edge surface, wherein said body defines at least one leader winding recess between at least two at least generally planar wall surfaces comprising at least one leader winding face recess within said face recess and at least one leader winding edge recess within said edge surface; wherein said leader winding recess is adapted to receive within it and protect at least a portion of said wound leader;

a plurality of spaced apart body anchor means adapted to anchor said attachment means;

wherein said wound leader has some elasticity; wherein said wound leader is wound on said device under tension; wherein at least one of said body anchor means is elevated substantially above said recess for anchoring said attachment means at an elevated location elevated substantially above the bottom of said leader winding recess; such that said attachment means are anchored to a respective body anchor means at least partially by a substantial downward anchoring force provided by said wound leader due to said elevated location and due to said tension of said wound leader which is wound below said elevated location in said leader winding recess.

16. A leader winding device according to claim 15, wherein said body anchor means are located adjacent said leader winding recess; and wherein the selection of a particular body anchor means for each of said attachment means helps to enable said wound leader of any given length to be wound on said device.

17. A leader winding device according to claim 16, wherein said at least one wound leader is adapted to be wound alternately among at least one adjacent pair of said body anchor means; and wherein the length of a particular route followed by said wound leader on said device varies substantially depending on said particular route followed by said wound leader with respect to said body anchor means to help to enable said wound leader of any given length to be wound on said device.

18. A leader winding device according to claim 15, wherein said at least one elevated body anchor means comprises a triple function elevated face post having a side wall defining an elevated face post hole; wherein a portion of said side wall extends generally transversely with respect to said wound leader; wherein said elevated face post hole is adapted to anchor said hook by said elevated face post hole being sized to receive at least the point of said hook therein within said side wall, wherein said hook is helped to be anchored in said elevated face post hole due to said tension of said wound leader; wherein said elevated face post hole is adapted to anchor said swivel by said elevated face post hole being sized to receive at least a portion of said swivel therein, wherein said swivel is helped to be anchored in said elevated face post hole by said swivel being urged to tilt in said elevated face post hole, due to said tension of said wound leader to tend to jam said swivel in said elevated face post hole; and wherein said elevated face post is adapted to anchor said loop by said elevated face post being sized to enable said loop to encircle said elevated face post, wherein said loop is helped to be anchored to said elevated face post due to said tension of said wound leader.

19. A leader winding device according to claim 18, wherein at least one of said face post means defines at the top thereof at least one notch; and wherein said notch is adapted to engage a portion of said swivel, to help to anchor said swivel, wherein said tension of said leader line tends to help keep said swivel engaged in said notch.

20. A leader winding device according to claim 15, wherein at least one of said elevated body anchor means is an elevated face opening defined by an elevated face opening side wall of said body; wherein one of said attachment means is a hook; and wherein said elevated face opening is adapted to anchor said hook at an anchor location elevated above the bottom of said leader winding recess by said elevated face opening being sized to receive at least the point of said hook therein within said elevated face opening side wall; wherein a portion of said elevated face opening side wall extends generally transversely with respect to said wound leader; wherein said anchor location is on said transverse portion of said elevated face opening side wall; and wherein said elevated anchor location for said hook helps to ensure said hook anchored in said elevated face opening is urged at least partially downwardly at an angle by said wound leader due to said tension of said wound leader to help ensure said hook stays anchored in said elevated face opening.

21. A leader winding device according to claim 15, wherein at least one of said body anchor means is a face post whose top is elevated above the bottom of its respective leader winding face recess; wherein said body further comprises face post rib means adjacent said at least one face post; wherein the top of said face post rib means is lower than the top of said at least one face post; and wherein the top of said face post rib means is elevated above the bottom of said leader winding face recess to support any said loop anchored by said face post to enable said loop to be more easily removed.

22. A leader winding device according to claim 15, wherein at least one of said anchor means is an edge step defined in the bottom of at least one said leader winding edge recess; wherein a parallel portion of said edge step extends generally parallel to said wound leader; wherein one of said attachment means is a hook; and wherein said parallel portion of said edge step is adapted to anchor said hook by engaging the point of said hook.

23. A leader winding device according to claim 20, wherein said leader further comprises a spinner secured to at least one of said hook and said leader line; and wherein said elevated face opening is relatively long and narrow and is sized to be adapted to receive at least a substantial portion of said spinner therein.

24. A leader winding device according to claim 15, wherein at least one of said body anchor means comprises an edge pillar adjacent at least one said leader winding edge recess, wherein the top edge surface of said edge pillar extends above the bottom of said leader winding edge recess; wherein said device further comprises at least one edge post located on said top edge surface of said edge pillar; wherein said at least one edge post is adapted to at least partially retain any portion of said leader line which is routed across said top edge surface of said edge post to help to enable said leader of any given length to be wound on said device.

25. A leader winding device according to claim 24, wherein said at least one edge pillar defines an edge pillar chamber which is adapted to entrap air if said device is dropped in the water to help to enable said device to float; and wherein said at least one edge pillar chamber comprises at least one body anchor means.

26. A leader winding device adapted to have securely wound about it at least one wound leader of any given length comprising a length of wound leader line having attachment means at each end thereof, wherein each said attachment means comprises one of a hook, swivel and loop, wherein said device comprises:

a body having at least one face surface, and at least one edge surface, wherein said body defines at least one leader winding recess between at least two at least generally planar wall surfaces comprising at least one leader winding face recess within said face recess and at least one leader winding edge recess within said edge surface; wherein said leader winding recess is adapted to receive within it and protect at least a portion of said wound leader;

a plurality of spaced apart body anchor means adapted to anchor said attachment means; wherein said body anchor means are located exterior to end adjacent said leader winding recess; wherein the selection of a particular body anchor means for each of said attachment means helps to enable said wound leader of any given length to be wound on said device; and elastic means extending transversely across at least one of said leader winding edge recesses; wherein said wound leader is adapted to pass over and deflect said elastic means into at least one corresponding leader winding edge recess; wherein said deflection of said elastic means maintains a tension on said wound leader to help keep said attachment means firmly anchored, to help keep at least a substantial portion of said wound leader in said leader winding recess, and to help keep said wound leader from becoming tangled; wherein the amount of said deflection of said elastic means helps to enable said wound leader of any given length to be wound on said device.

27. A leader winding device according to claim 26, wherein said wound leader has some elasticity; wherein said wound leader is wound on said device under tension; wherein at least one of said body anchor means is elevated and is adapted to anchor said attachment means at an elevated location elevated substantially above the bottom of said leader winding recess; and wherein said attachment means are anchored to a respective elevated body anchor means at least partially by a substantial downward anchoring force provided by said wound leader due to said elevated location and due to said tension of said wound leader which is wound below said elevated location in said leader winding recess.

28. A leader winding device according to claim 27, wherein said at least one elevated body anchor means comprises a triple function elevated face post having a side wall defining an elevated face post hole; wherein a portion of said side wall extends generally transversely with respect to said wound leader; wherein said elevated face post hole is adapted to anchor said hook by said elevated face post hole being sized to receive at least the point of said hook therein within said side wall, wherein said hook is helped to be anchored in said elevated face post hole due to said tension of said wound leader; wherein said elevated face post hole is adapted to anchor said swivel by said elevated face post hole being sized to receive at least a portion of said swivel therein, wherein said swivel is helped to be anchored in said elevated face post hole by said swivel being urged to tilt in said elevated face post hole, due to said tension of said wound leader to tend to jam said swivel in said elevated face post hole; and wherein said elevated face post is adapted to anchor said loop by said elevated face post being sized to enable said loop to encircle said elevated face post, wherein said loop is helped to be anchored to said elevated face post due to said tension of said wound leader.

29. A leader winding device according to claim 28, wherein at least one of said face post means defines at the top thereof at least one notch; and wherein said notch is adapted to engage a portion of said swivel, to help to anchor said swivel, wherein said tension of said leader line tends to help keep said swivel engaged in said notch.

30. A leader winding device according to claim 27, wherein at least one of said elevated body anchor means is an elevated face opening defined by an elevated face opening side wall of said body; wherein one of said attachment means is a hook; and wherein said elevated face opening is adapted to anchor said hook at an anchor location elevated above the bottom of said leader winding recess by said elevated face opening being sized to receive at least the point of said hook therein within said elevated face opening side wall; wherein a portion of said elevated face opening side wall extends generally transversely with respect to said wound leader; wherein said anchor location is on said transverse portion of said elevated face opening side wall; and wherein said elevated anchor location for said hook helps to ensure said hook anchored in said elevated face opening is urged at least partially downwardly at an angle by said wound leader due to said tension of said wound leader to help ensure said hook stays anchored in said elevated face opening.

31. A leader winding device according to claim 26, wherein at least one of said body anchor means is a face post whose top is elevated above the bottom of its respective leader winding face recess; wherein said body further comprises face post rib means adjacent said at least one face post; wherein the top of said face post rib means is lower than the top of said at least one face post; and wherein the top of said face post rib means is elevated above the bottom of said leader winding face recess to support any said loop anchored by said face post to enable said loop to be more easily removed.

32. A leader winding device according to claim 26, wherein at least one of said anchor means is an edge step defined in the bottom of at least one said leader winding edge recess; wherein a parallel portion of said edge step extends generally parallel to said wound leader; wherein one of said attachment means is a hook; and wherein said parallel portion of said edge step is adapted to anchor said hook by engaging the point of said hook.

33. A leader winding device according to claim 30, wherein said leader further comprises a spinner secured to at least one of said hook and said leader line; and wherein said elevated face opening is relatively long and narrow and is sized to be adapted to receive at least a substantial portion of said spinner therein.

34. A leader winding device according to claim 26, wherein at least one of said body anchor means comprises an edge pillar adjacent at least one said leader winding edge recess, wherein the top edge surface of said edge pillar extends above the bottom of said leader winding edge recess; wherein said device further comprises at least one edge post located on said top edge surface of said edge pillar; wherein said at least one edge post is adapted to at least partially retain any portion of said leader line which is routed across said top edge surface of said edge post to help to enable said leader of any given length to be wound on said device.

35. A leader winding device according to claim 34, wherein said at least one edge pillar defines an edge pillar chamber which is adapted to entrap air if said device is dropped in the water to help to enable said device to float; and wherein said at least one edge pillar chamber comprises at least one body anchor means.

* * * * *